United States Patent [19]

Brown et al.

[11] 4,367,525

[45] Jan. 4, 1983

[54] CPU CHANNEL MONITORING SYSTEM

[75] Inventors: Glen A. Brown, Sunnyvale; Steven D. Berliner, San Jose, both of Calif.

[73] Assignee: Tesdata Systems Corporation, McLean, Va.

[21] Appl. No.: 156,950

[22] Filed: Jun. 6, 1980

[51] Int. Cl.³ .............................................. G06F 11/34
[52] U.S. Cl. .................................................. 364/200
[58] Field of Search ... 364/200 MS File, 900 MS File; 235/92 DP

[56] References Cited

U.S. PATENT DOCUMENTS

| 3,399,298 | 8/1968 | Taylor . | |
|---|---|---|---|
| 3,522,597 | 8/1970 | Murphy | 364/200 X |
| 3,540,003 | 11/1970 | Murphy | 364/200 |
| 3,588,837 | 6/1971 | Rash et al. | 364/900 |
| 3,692,989 | 9/1972 | Kandiew | 364/200 X |
| 3,763,474 | 10/1973 | Freeman et al. | 364/200 |
| 3,818,458 | 6/1974 | Deese | 364/200 |
| 3,906,454 | 9/1975 | Martin | 364/200 |
| 4,166,290 | 8/1979 | Furtman et al. | 364/200 |

Primary Examiner—Mark E. Nusbaum
Assistant Examiner—Thomas M. Heckler
Attorney, Agent, or Firm—Sughrue, Mion, Zinn, Macpeak & Seas

[57] ABSTRACT

A computer monitoring system connects into the channel (24), serving as a link between a CPU (10) and peripheral devices (12), (14), (16). Channel signals are extracted in a channel interface module (18), altered to be compatible with the logic in a data collection module (20) and sent to a data collection module (20) along with event codes generated within the channel interface module (18) to indicate certain sequences and/or combinations of signals occurring on the channel (24). The data collection module (20) is programmable to select those peripheral devices it wants to monitor and the type of information to be collected. The data collection module (20) also includes circuitry for counting the number of successive search commands performed for a device without collecting the information contained therein for each command as well as circuitry for measuring the percentage of activity of each device and the channel as a whole.

22 Claims, 11 Drawing Figures

CPU CHANNEL MONITORING SYSTEM

RELATED APPLICATIONS

The invention described herein is an improvement to the invention described in Furtman et al, U.S. Pat. No. 4,166,290. The disclosure of the latter is incorporated herein by reference.

BACKGROUND OF THE INVENTION

The present invention is in the field of computer performance monitoring equipment.

Computer performance monitoring has become an established industry within the much larger data processing industry. Performance monitoring is necessitated by the high costs of equipment, the large variety of hardware and software, and the need to optimize the utilization of such equipment. Broadly, monitoring equipment provides the user with information concerning the events taking place in computer equipment, when such events take place, and the frequency of such events. Both hardware and software and combination hardware/software monitors are presently in use. The hardware picks off signals from CPUs or peripheral devices, notes the time of occurrence of such signals, stores the signals and/or the time and/or the fact of the signal occurrence, and may provide a visual output of such information to the user. Software is used principally to format the collected data in useful form for the computer user.

The standard monitors select the signals for monitoring by attaching a probe to a line inside the CPU or peripheral device carrying the signals to be measured. The probes consist of differential amplifiers which present a high impedance to the line to which they are attached. Two significant problems with this standard method are lack of flexibility and a substantial increase in probes necessary for collecting a large variety of information. For example, once the probes are attached, the signals measured are determined. To measure different signals, the probes have to be removed and attached to other lines. Also, if it is desired to measure activity in a CPU and in a plurality of peripheral devices and collect such information, a substantial number of probes would be required and it would be necessary to provide long cables from those probes attached to distant peripheral units.

Prior art monitors are the subject of several patents. Taylor, U.S. Pat. No. 3,399,298, provides direct connection to specific elements of the host computer to be monitored. The monitor counts standard clock pulses to provide an indication of a time period during which the specific element is being checked. During that time period, a second counter is provided with the same clock pulses but only during the moments while the element being monitored is active. Thus, the ratio of the two counts in the two counters indicates an efficiency measurement for the particular device being monitored.

A patent to Martin, U.S. Pat. No. 3,906,454, is directed toward a monitor for a host computer. According to the Martin patent, the host computer must be specially programmed or arranged to provide signals that indicate to the monitor that certain other signals should be accumulated or otherwise processed for monitoring.

The Deese U.S. Pat. No. 3,818,458 departs from the technique for counting or timing individual signals received from various points in a computer, but does so by only monitoring certain specific computer status indications and recording the time at which there is a change in one of these status indications.

Other standard monitoring systems or apparatus are taught by Freeman, et al., U.S. Pat. No. 3,763,474, Murphy, U.S. Pat. No. 3,540,003, Murphy, U.S. Pat. No. 3,522,597, Rash, et al., U.S. Pat. No. 3,588,837, and Kandiew, U.S. Pat. No. 3,692,989.

The Furtman et al patent, mentioned above, describes a monitor which connects to the CPU channel in the same manner as a peripheral unit and receives all information, commands, etc. on the channel. The system is capable of selecting the type and quantity of information to be collected from the channel based on the peripheral which is communicating with the CPU. The monitor consists essentially of a channel interface module, a data collection module, and microprocessors and memories. The system monitors combinations of signals and sequences of signals and generates event codes which identify the combinations and sequences, by reducing the data picked off the channel in accordance with programmable instructions for each peripheral device on the channel, and collects packets of information in dependence upon the event code generated.

While the system of the Furtman et al patent satisfies the objects disclosed therein, it has been observed in practice that certain aspects of the system resulted in the collection of too much information in the hardware FIFO registers, with the consequent loss of some desirable information due to the FIFO being full. Other drawbacks were the dependence upon the microcomputer associated with the hardware for the performance of too many calculations.

One host sequence which generates a lot of signals on the channel is a search sequence. That sequence is initiated by the host when it is looking for certain information on disks or elsewhere. The host places a search command on the channel with accompanying other information in the same manner that it generates other commands. However, in the case of a search it is not unusual to have the host put one to two hundred search commands on the channel in sequence in rapid order. The system does this until it finds what it is searching for or it gives up. In the prior system, each search command plus other relevant information associated with each command, i.e., pseudo address, time stamp, etc., was entered into the FIFO for subsequent transfer to the microcomputer. Unfortunately, all that information often filled the FIFO before it was emptied by transfer to the microcomputer. Thus, other desirable measurement data appearing on the channel would not get into the FIFO and would be lost.

Additionally, in the Furtman et al system, provision was made for rejecting all information or certain categories of information by peripheral device only. However in some desirable measurement operations there are certain types of commands which are simply of no interest irrespective of the peripheral device to which the command is given. Thus in the Furtman et al device, when the user was implementing such operations, the monitoring hardware would end up collecting a lot of unwanted information, thereby using FIFO space, and that information had to be eliminated in the microprocessor.

Another drawback was in the method contemplated for obtaining utilization information. Utilization information, also known as percent activity, is a measure of the operating time of a certain element or device as a percent of the total on-time of the system. In the Furtman et al system it was intended that utilization information would be determined entirely as a software function of the microprocessor based on the time stamps which accompanied every packet of information in the FIFO. However, due to the large number of peripheral devices connected to the channel, calculating utilization information for all or selected devices turned out to require too much computing power.

SUMMARY OF THE INVENTION

It is therefore an object of the present invention to provide a computer performance monitor which overcomes the above-mentioned problems.

It is an object of the present invention to provide, in a monitor which connects to and receives signals on a CPU channel, apparatus and a method for discriminating against information relating to repetitive search sequences on the channel.

It is an object of the present invention to provide, in a moniter which connects to and receives signals on a CPU channel, apparatus and a method for discriminating against information relating to selected commands on the channel.

It is a further object of the present invention to provide, in a moniter which connects to and receives signals on a CPU channel, apparatus and a method for obtaining utilization information about all or selected peripheral devices connected to the channel in a simplified manner.

It is a further object of the present invention to provide an improved computer monitoring system which is efficient in its operation.

These and other objects of the invention are achieved by providing a monitor comprising one or more channel interface modules (CIM) and one or more data collection modules (DCM). The CIM is connected to the CPU channel as a peripheral device and comprises means for receiving all data, address, command and status information on the channel. It provides the latter information on a bus to the DCM. The CIM also includes means for receiving selected condition flags on the channel and for providing condition strobes to the DCM. It also includes means for generating event codes based upon the combination and sequences of condition flags on the channel. The DCM is connected to the CIM and receives all of the signals collected by the CIM. The DCM includes means which select the type and quantity of information desired depending on the operation being run by the user. It collects the information in packets, loads the packets in a FIFO and feeds it to a microcomputer comprising plural microprocessors and associated memories, as well as a shared memory and other standard circuitry found in microcomputer operations.

The DCM includes a random access memory which is loaded with command rejection information by the user. Each command passed through the CIM is examined. If it corresponds to one to be rejected, a further command reject flag is entered into another RAM at an address corresponding to the peripheral device presently responding to the command. The latter reject flag blocks all channel signals pertaining to that peripheral from being collected in the FIFO for as long as the unwanted command is being carried out.

The DCM also includes means which detects the first in a sequence of search requests, allows the initial search command and accompanying information to be entered into the FIFO, and thereafter blocks all subsequent search commands and related information from the FIFO until such time as the sequence of requests ends.

The DCM further includes hardware means, including several RAM's, for obtaining utilization information about all peripherals or only those selected by the user and about the channel itself. In one RAM an enable flag is entered in every location corresponding to a peripheral device for which utilization information is desired. Also, in that RAM, a busy flag is entered in the appropriate location whenever a peripheral starts an operation and is removed whenever that peripheral terminates an operation. The entire RAM is scanned at a rapid rate. Another RAM is organized to provide a separate counter for each peripheral. If, during the scan, a given peripheral has busy and enable flags stored in its assigned location, the counter for that peripheral is incremented. The count information is read out periodically to the microcomputer.

In accordance with the invention, the activity of each device is measured by first determining when the device is in a busy state and has been activated as indicated by an enable signal when these conditions have been sensed, a counter corresponding to the particular device of interest is started. The total count until the device ceases operation is counted. In the preferred embodiment, the counters are implemented with a random access memory in which each device to be monitored has a corresponding address in the memory.

More specifically, in accordance with the objects of the invention, there is provided a system for monitoring a plurality of data processing devices for determining the amount or percentage of usage of each of the devices over a predetermined monitoring time period with each of the devices producing at least one signal indicating when the device is in an active state. This system includes a random access memory having at least one address location of multiple bits for each of the devices being monitored. Means are provided for producing addresses coupled to the address inputs of the random access memory wherein the address producing means produces in sequence addresses corresponding to at least plural ones of the devices being monitored. The output of the random access memory is coupled to an adder having its outputs coupled back to the data inputs of the random access memory. As used herein, adder means encompasses both adding and subtracting devices as they are essentially equivalent and complimentary as is well known for binary arithmetic. There is also included in this system means for providing a signal to an input, such as the carry-in input, of the adder means which indicates whether or not the device to which the address input corresponds is in the active state, wherein the data output value from the memory is changed if the device is in the active state while the data output remains unchanged if the device is not in the active state. Preferably, the address producing means is implemented as a cyclic counter. The signal producing means may be a multiplexer receiving its selection inputs from the counter, that is, it has the same address inputs as the random access memory. In another embodiment, the signal producing means may be a second random access memory which receives its address inputs from the address producing means. In this case, the signal providing means further includes gate means, such as an AND gate, having one input coupled to each of the two data outputs from the second random access memory and with its output coupled to an add end input of the adder means.

DETAILED DESCRIPTION OF THE INVENTION

A preferred embodiment of the invention will be described in the environment of monitoring the performance of an IBM 360 or 370 computer system. However, it will be understood that the invention is applicable to other computer systems.

Figure 1:
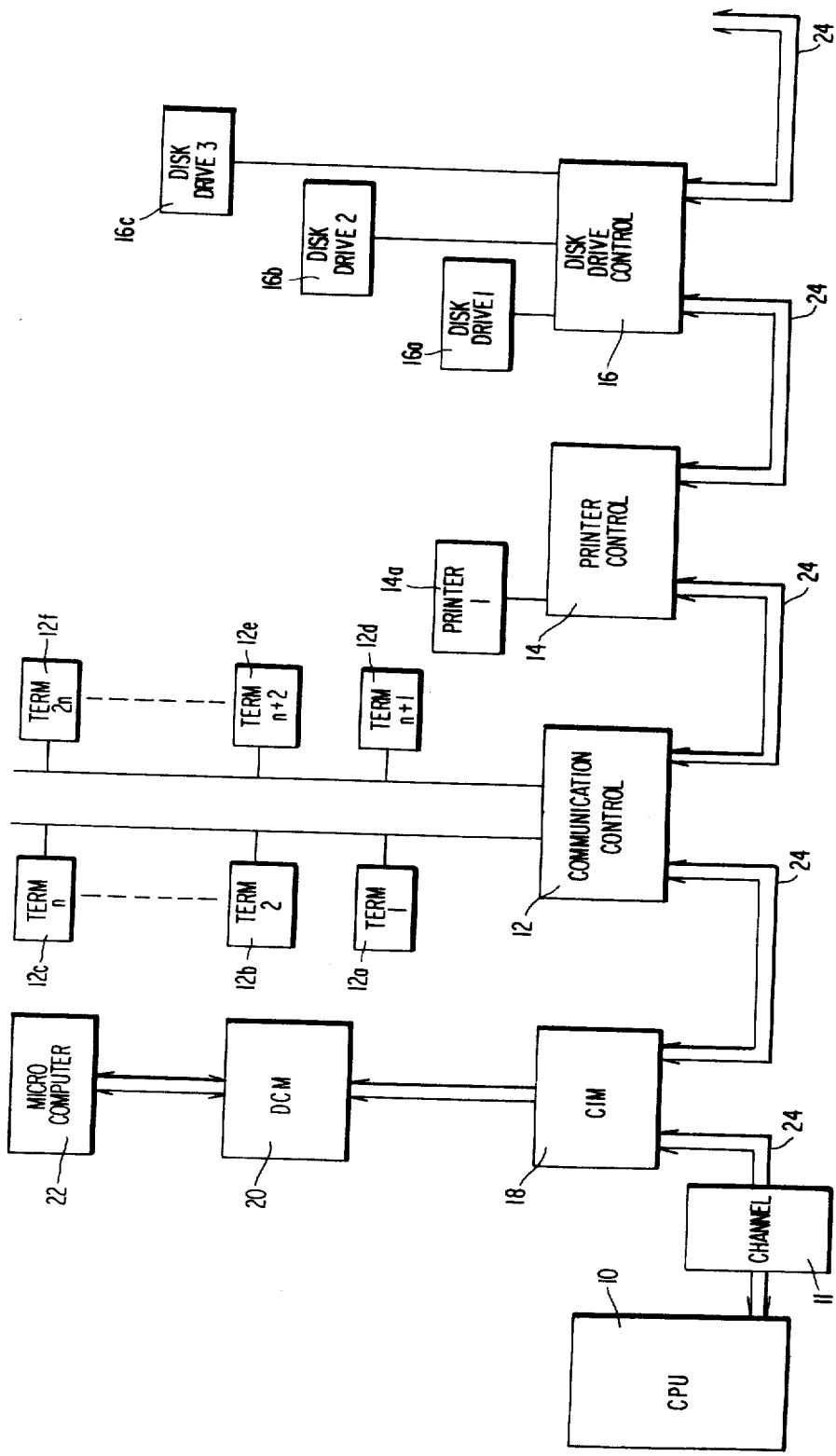
FIG. 1 is a block diagram of a preferred embodiment of the present invention as connected with a host system.

A CPU and peripheral device arrangement is shown in FIG. 1 and includes CPU 10, channel 11, channel bus 24, controllers 12-16, terminals 12a-12f, printer 14a and disk drives 16a-16c. The peripheral devices illustrated represent only a sampling of such devices that may be connected to the channel bus 24. The devices shown are connected to the CPU channel 11 via communication control 12, printer control 14 and disk drive control 16 and via bus 24. As is well known, the channel bus carries addressing information, commands, status information, data, and flags or control signals back and forth. The particular arrangement and sequence of such signals on an IBM 360/370 channel is disclosed in several publications. For reference, see IBM Publication No. GA-22-6974, entitled "Channel to Control Unit OEM Information."

In general, each channel bus comprises thirty-nine (39) active lines, nine lines carry a parallel eight-bit word plus parity out (from the CPU), nine carry a parallel eight-bit word plus parity in (to the CPU), two are for address-in and address-out flags, one is for command-out flag, two are for service-in and service-out flags, two are for data-in and data-out flags, one is for status-in flag, two are for OP-in and OP-out flags, one is for the hold out flag and one is for the suppress out Flag. The other nine lines are not needed for monitoring. The eighteen (18) lines carry eight-bit bytes plus parity are referred to as the bus-in and bus-out lines. Those lines carry address bytes, command bytes, status bytes and data bytes.

Although there are several sequences of signals on the channel, a typical sequence, designated as the Initial Select Sequence, is as follows: The CPU sends an address byte on the bus-out lines, designating a particular device, and raises the address-out flag; the device sends its address on the bus-in lines and raises the address-in flag; the CPU sends a command byte on the bus-out lines and raises the command-out flag; the device sends a status byte on the bus-in lines and raises the status-in flag; the device performs the command which may be to send or receive multiple bytes of data on the bus-in or bus-out lines, respectively. For complete details of the initial select sequence and other sequences, reference may be made to IBM Publication No. Ga-22-6974.

According to the present invention, the activity of the devices is monitored by connecting directly to the channel bus a monitor consisting of a channel interface module (CIM) 18 and a data capture module (DCM) 20. The monitor also preferably includes its own processing unit and main memory, shown generally as a microcomputer 22, for collating the data and presenting it to the user in any of a variety of typical formats. The collation and data presentation, as well as the programming of the microcomputer, does not constitute a feature of the invention claimed herein, and, consequently, details of such a process will not be provided. However, microcomputers are well known in the art, as is monitoring software. Furthermore, given the arrangement of data collated for presentation by the DCM 20, anyone of ordinary skill in the monitoring and software arts would be able to program such a known microcomputer to provide the desired collation and formatting of the information.

Among the typical devices that the invention can monitor are communications front ends such as the IBM 3705 and Comten 3670; unit record equipment, such as printers, card readers, etc.; and direct access storage devices (DASD) similar to IBM's 3330 and 3350 mass storage devices. The type of information that can be gathered on these three classes of data processing equipment is described below.

As the importance of channel communications increases, performance accountability of this area becomes critical. The monitor can see every event on the channel. Consequently, the user can combine data in many ways to produce measurement data. The monitor can measure communications processing delays, or the time spent on a given transaction by the host processor hardware and software, such as the amount of time between the transaction first entering the host CPU via the channel and exiting the host CPU by the same channel. The monitor also checks for sequences of signals or character strings. It can also recognize character sequences. In addition to measuring message length, it can also measure message traffic, message direction (in or out of CPU) and message rate distribution. It is also able to recognize particular sequences of signals that are embedded in a particular segment of the sequence.

Since everything on a channel bus is apparent to the monitor, unit/record events are particularly suited to be measured. Formerly, significant resources were required to measure unit/record events. But as unit/-record events process records one at a time, the monitor expends minimum resources to obtain information which formerly was difficult to obtain. For example, such measurements as the following can now be routine: number of cards read, number of cards per second (minute, hour, day, etc.), and number of lines (pages, characters, etc.) printed per page (or unit of time).

The monitor can make DASD measurements, such as: contetion analysis by device and control unit; rotational position sensing timings by device; reserve/release timings by device; seek timing, seek address and seek counts by device; block size distribution; and device, control unit and channel busy statistics.

The CIM 18 monitors all of the activity on the selector or block multiplexer channel, but does not in any way interact with it. The CIM itself preferably resides under the machine room floor where it is connected directly into the channel cabling. The added resistance caused by the CIM should not exceed 2 ohms for any of the individual conductors making up the cable harness. This must remain valid for cable lengths approaching six feet in length with two IBM compatible connectors, such as the AMP models 86719-1 and 86719-2 attached to either end. In addition, the CIM must not draw more than 5 milliamps at a reference voltage of 3.11 volts from any of the bus or tag lines. The CIM must not interfere with the channel operation so that repeated CIM power interruptions will have no effect on normal channel operation. The CIM can be connected to the channel cables anywhere between the channel controller and the channel terminator.

The CIM performs the functions of detecting combinations and sequences of flags on the channel and generating event codes identifying the combinations and sequences, level changing and duration changing certain flags to levels and durations usable at the DCM, and multiplexing the bus-in and bus-out data lines onto a single group of bus lines for presentation to the DCM. It should be noted that the CIM collects and passes on to the DCM all data bytes on the bus lines—i.e., there is no selection or data sampling in the CIM.

The DCM receives the information presented to it by the CIM and operates to either ignore the information, collect packets of information, excluding data pertaining to a particular device, or collect packets of information plus disc drive CYLINDER, HEAD and SECTOR addresses when a seek or set sector command is involved. In addition, the DCM contains circuitry for counting the number of successive search commands performed for a device, without collecting the packets of information themselves for each command, and circuitry for measuring the percentage of activity of each device and of the channel as a whole. Because of this, as will become more evident from the discussion which follows, the monitoring of the channel is more efficiently accomplished in that the system's microprocessor need not process a packet for each search command and it is not necessary to process packets for a device to determine the amount of time it is busy.

Additionally, the DCM is capable of rejecting all information pertaining to certain commands, irrespective of the peripheral device to which the command pertains. This is a particularly useful function for certain monitoring operations. For example, if the monitor is being used for motion analysis of discs, data transfer information would be of no interest to the operator. Consequently, in such circumstances the DCM would contain control words instructing it to ignore data transfer commands appearing on the channel.

Also the system in the DCM for obtaining the SEEK and SET SECTOR information is simpler than in the prior monitor. The response of the DCM to search commands also is more efficient than in the prior monitor in that unnecessary information is eliminated from that sent to the microcomputer.

Figure 2:
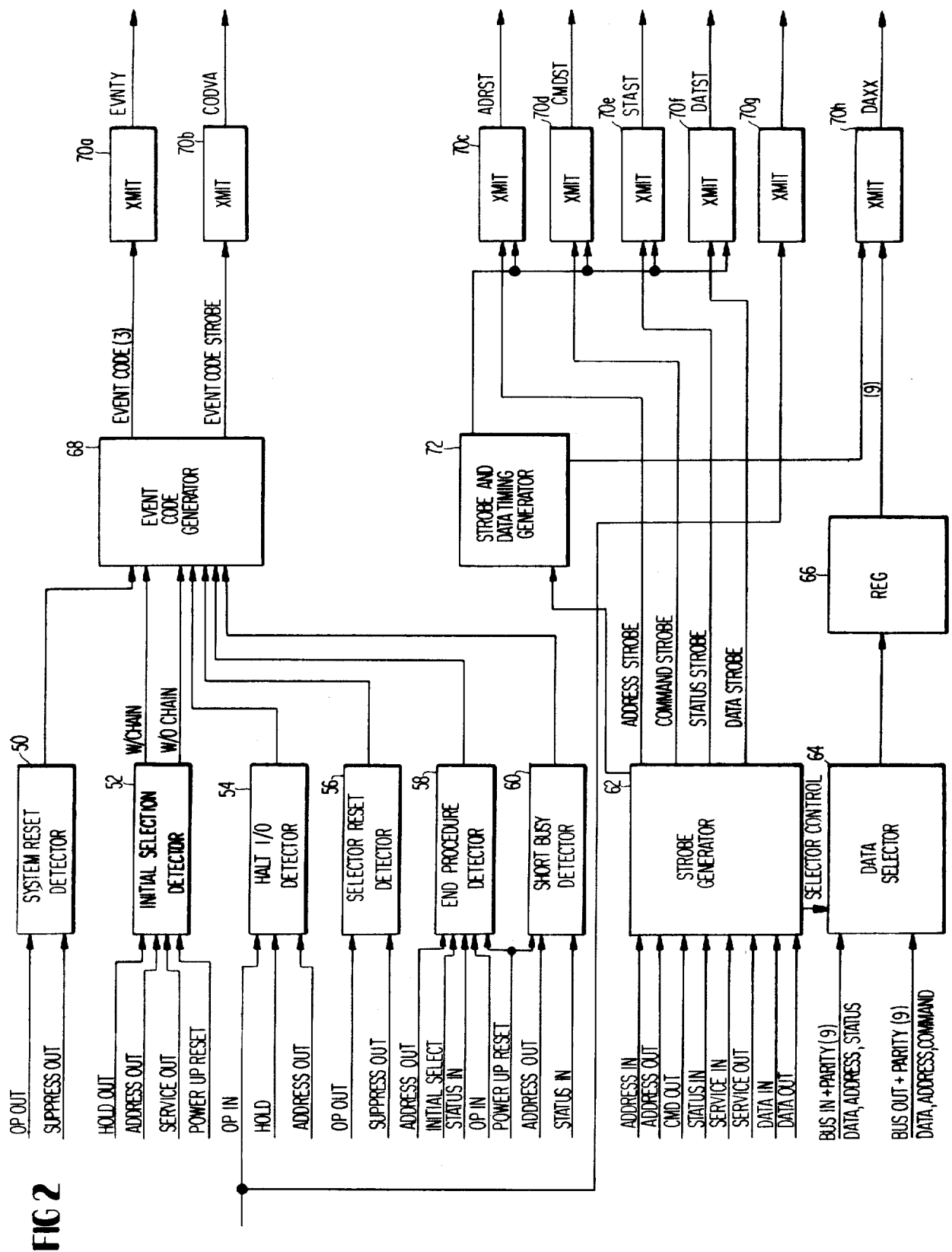
FIG. 2 is a block diagram of a channel interface module according to a preferred embodiment of the present invention.

A block diagram of a CIM is illustrated in FIG. 2. It comprises a plurality of event detectors 50-60, an event code generator 68, a strobe generator circuit 62, a data selector 64, a register 66, a strobe and data timing generator 72 and a plurality of transmit circuits 70a-70h. Each of the event detectors detects a signal state change or a certain set of or sequence of conditions on the channel and provides a TRUE or "1" output when the designated conditions are satisfied. The six detectors provide a total of seven outputs. The seven detector outputs are provided to an event generator 68 which provides an unique three-bit parallel output which identifies the highest priority TRUE input line and, therefore, identifies the event detected. For each event code generated, the generator 68 also raises the event code strobe.

The strobe generator circuit 62 receives eight channel flags, and, in response thereto, provides four output strobe pulses of proper level for use in the DCM. The address-in, address-out, command-out and status-in flags result in the address, command and status strobes, respectively. Each of the service-in, service-out, data-in and data-out flags results in the data strobe. The period between strobes and the duration of each strobe is controlled by the strobe and data timing generator 72. These strobes also control the selection of BUS IN or BUS OUT channel data for presentation to the DCM.

The data selector 64 receives the eight bus-in lines plus parity and the eight bus-out lines plus parity and multiplexes those lines onto eight bus lines and one parity line which are connected to a nine-bit register 66. The transmit circuits 70a-70h transmit the designated codes, strobes and data to the DCM.

Figure 5:
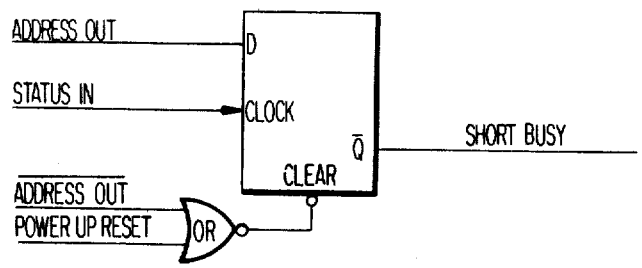
FIG. 5 is a block diagram of the short busy detector of FIG. 2.

The short busy detector 60 is shown in detail in FIG. 5 and comprises a single D flip-flop and an OR gate. The short busy flip-flop output will become TRUE when the address-out flag is TRUE and status-in flag goes TRUE. The short busy event is an indication that the device is not available to accept a command and occurs when the controller for the peripheral device raises the status-in flag while the address-out flag is still up. This prevents an initial select sequence from progressing to completion.

Figure 6:
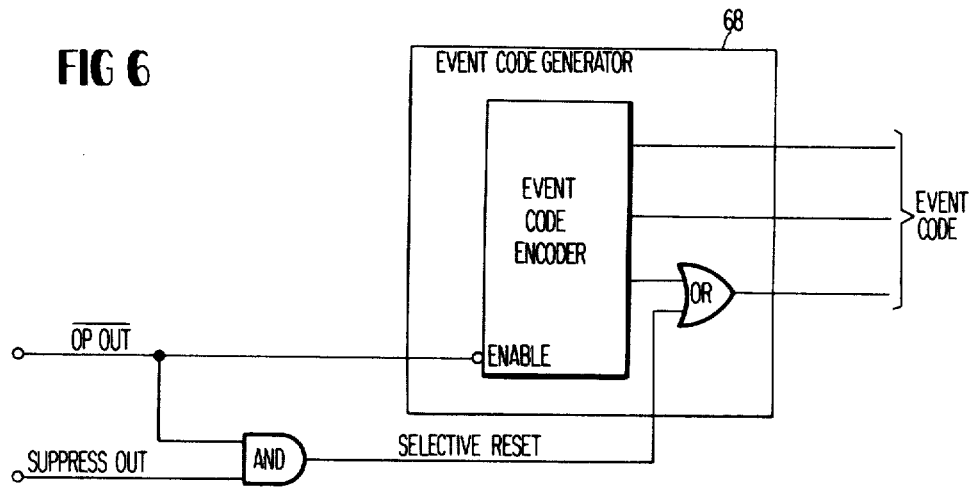
FIG. 6 is a block diagram of the system reset detector and the selective reset detector of FIG. 2.

Referring to FIG. 2, it is seen that the system reset detector 50 and the selective reset detector 56 depend upon the OP-out and suppress-out flags. In actual operation, the false state of the OP-out flag is connected to an enable input of event code generator 68, forcing all outputs to zero. The lowest order bit of the output code is connected to an OR gate, the other input being the output resulting from an AND connection of OP-out and suppress-out. This is shown in FIG. 6. Thus, if the OP-out flag is false, there will be generated either a system reset event code or a selective reset event code, depending upon the state of the suppress-out flag.

Figure 8:
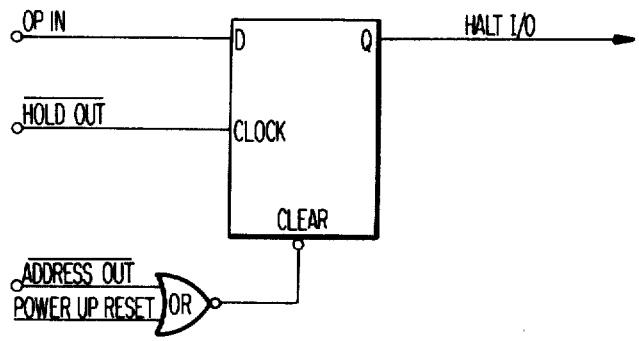
FIG. 8 is a block diagram of the halt I/O detector of FIG. 2.

The halt I/O (or disconnect) detector 54 is shown in detail in FIG. 8 and comprises a D-type flip-flop which is clocked when the hold-out flag goes FALSE, is cleared when the address-out goes FALSE, and has the OP-in applied to its D input. As long as the address-out flag is TRUE, the flip-flop can be set to the state of the D input, which corresponds to the state of the OP-in flag whenever the hold-out flag goes FALSE.

Figures 9, 10:
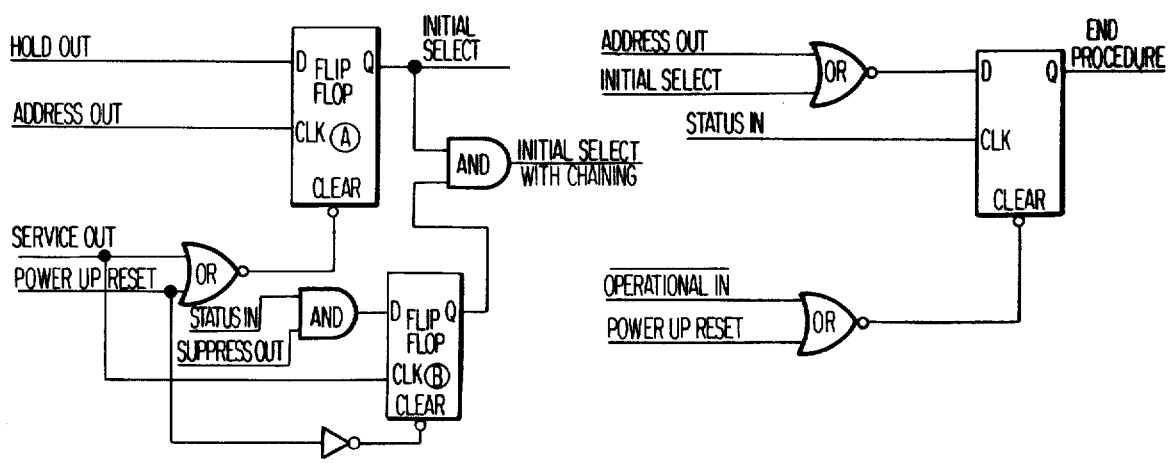
FIG. 9 is a block diagram of the initial select detector of FIG. 2.
FIG. 10 is a block diagram of the end procedure detector of FIG. 2.

The initial select detector 52 of FIG. 2 is shown in FIG. 9 comprising a pair of D flip-flops, an OR gate with inverted output (i.e., a NOR gate), two AND gates and an inverter. Flip-flop A is clocked to provide a TRUE or FALSE output corresponding to the logic state of the hold-out input whenever address-out goes TRUE. Flip-flop A is reset whenever service-out or power-up reset goes TRUE.

"Chaining" is indicated when STATUS IN and SUPPRESS OUT are both TRUE and SERVICE OUT goes TRUE setting flip-flop B. The first initial select of a sequence of operations will not affect this flip-flop B, but the next initial select will enable both the chaining and initial select inputs to the encoder. Chaining, being a higher priority operation, will override an initial select. Depending on the condition of SUPPRESS OUT, chaining will set or reset at the end of the initial select sequence. In this context, "chaining" is initiated by the CPU on the channel by the setting of a special control bit which indicates that the channel wants to perform an entire sequence of operation with only a single device without activating other devices which may attempt to come on line and interfere with the operations with the selected single device. Once "chaining" has been indicated, the channel is prevented from executing operations with control words corresponding to other than the selected single device.

The end procedure detector 58 of FIG. 2 is shown in FIG. 10 as comprising a pair of OR gates with inverted outputs and a D flip-flop. The flip-flop is clocked by status-in going TRUE to assume the state corresponding to that applied to the D input. The latter is TRUE only when address out and initial select are FALSE. The flip-flop is reset by either OP-in going FALSE or power-up reset going TRUE.

Figure 4:
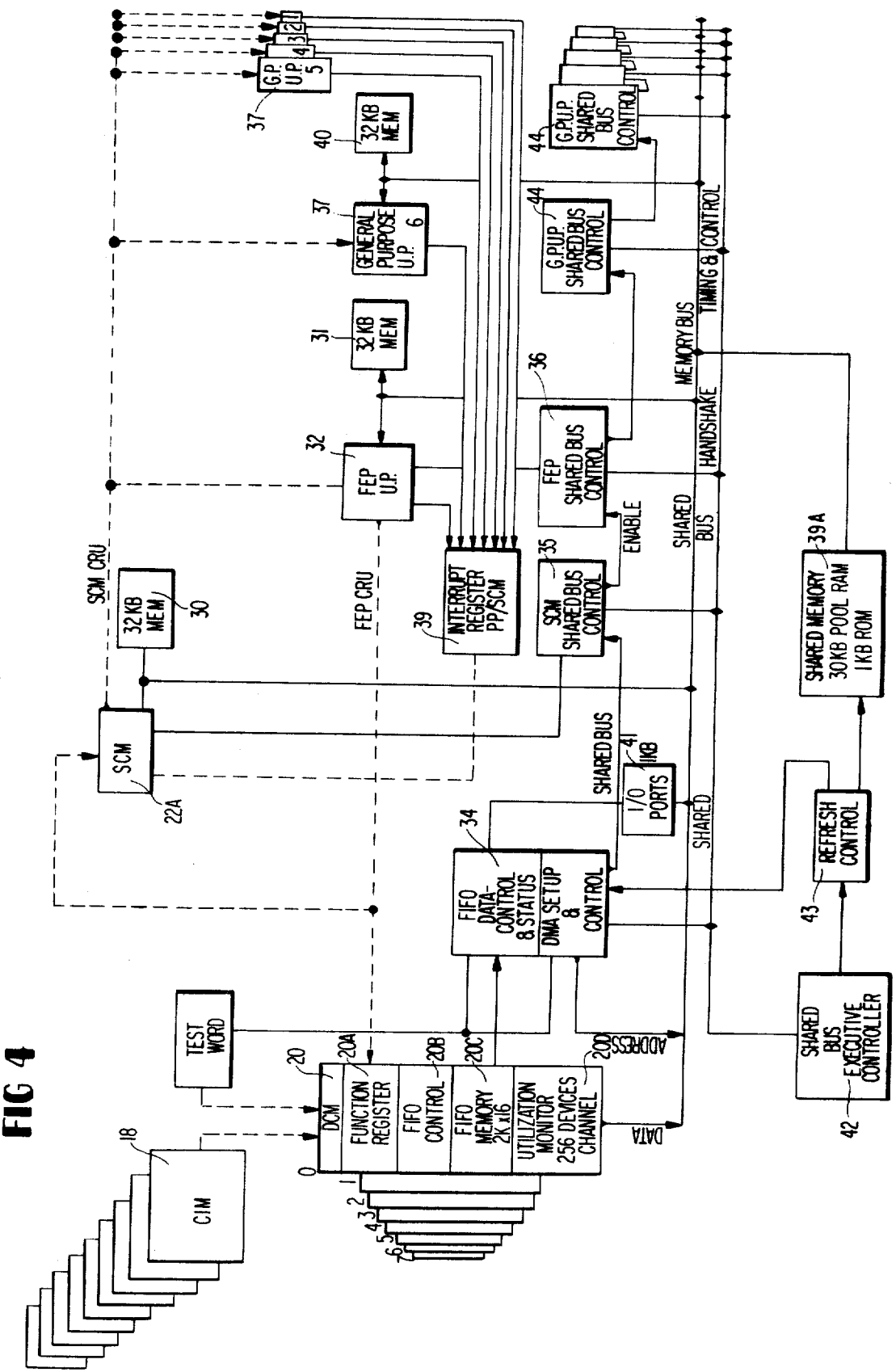
FIG. 4 is a block diagram showing the interface between the DCM and the microprocessor.

As pointed out previously the information from the CIM is presented to the DCM and the information generated by the DCM is presented to the microcomputer. In practice the microcomputer 22 may consist of eight microprocessors, each having a 32K bit memory associated therewith. The interface between the microprocessors and the DCM is illustrated in FIG. 4. A plurality of CIM's 18 are also shown to illustrate the fact that there are multiple CIM's per DCM. Also there can be multiple DCM's 20 per monitoring system.

It should be noted that the microcomputer per se and its connection to the DCM's does not constitute a part of the invention claimed herein. Further, anyone of ordinary skill in the art of microprocessors and monitoring will be capable of providing desired programming for taking data from a DCM and processing it into desired formats for presentation to the user. The general outline of the microcomputer and its connection to the DCM is provided here only to provide the reader with an example of such systems.

Six of the eight microprocessors of the microcomputer 22 are shown at 37, with associated memories at 40. The seventh microprocessor 32 is a front end processor (FEP) and has memory 31 associated therewith. The eighth microprocessor 22A is the systems control module (SCM) and has a memory 30 associated therewith.

The systems control module (SCM) 22A communicates with the other processors through a communications register unit bus (CRU) and has the capability of interrupting those processors and putting them on hold or causing them to reset and reload. The front end processor (FEP) 32 is primarily used to control and accept data from the DCM modules 20. The FEP 32 communicates with the data collection modules 20, of which there can also be eight units, through its communications register unit (CRU) bus. The FEP 32 also can interrupt the system control module 22A via the CRU bus. However, it cannot put the system control module 22A on hold or cause it to reset and/or reload.

Four of the remaining processors 37 are considered as general purpose microprocessors and are used for data reduction as determined by the SCM and FEP. These general purpose microprocessors are used to reduce the data collected by the DCMs 20 to a single package or buffer of data and interrupt the system control microprocessor for transmission of that data representing activity of the monitored system. The primary interface is the interrupt register parallel processor 39 connected to the SCM. The SCM module 22A, when interrupted at a particular interrupt level, determines which general purpose microprocessor has caused the interruption and, in response, reads a general table in a shared memory 39A thus determining where the information was stored and performing transmission of the data to an external processor. The other processors 37 provide additional processing power but are not presently used.

Each of the processors has a 32K byte memory 40 called a program memory and all share a common 30K byte pool RAM 39A. There is also incorporated in the memory 39A, a one K byte ROM where all processors receive their basic load instructions and from which the SCM receives its communication program instructions for communicating with the external processor on the initial loading of the system.

There is also a 1K byte addressable I/O ports 41 which is used by the microprocessors to communicate with the DCM 20. These ports also communicate with error registers, system I.D., communication band rate controls, and DMA control registers. This circuitry is generally termed the DCMI or Data Collection Module Interface structure. There is also provided a shared bus executive controller 42 which handles the "handshake" between the processors and the DCMI and ensures proper allocation of the bus.

The Data Collection Modules 20 are divided into four major segments, a Function Register 20A, a FIFO control 20B, and FIFO memory 20C, and a utilization monitor 20D. Each DCM can have up to eight channel interface modules attached thereto. However, only one Channel Interface Module 18 can be active for any one DCM 20 at a time. This activity is controlled through the DCM function register 20A by the FEP 32. By selecting a particular Channel Interface Module, the DCM causes power to be provided to that Channel Interface Module 18. The function register of the DCM also is used for set up purposes, i.e., to initialize the various latches and RAM's in the DCM, and to control direct memory access (DMA) transfers from the DCM to the shared memory 39A.

All or selected events on the channel are monitored by the DCM at the option of the user and can be stored in the FIFO memory for evaluation and reduction and for future reports generated by the external processor system. The events defined as channel sequences do not include the actual data transfered by those sequences. For example, assuming a given device is initially selected and commanded to read data. Subsequently that event will be recorded in the FIFO by an indication that the procedure has been completed. However, no data is captured by the FIFO in that transaction, just the control information related to the fact that the particular device was selected for that function and that function has been completed. However, a data collection function can be added to the DCM simply by adding hardware corresponding to that which collects data in the DCM of the Furtman et al system. In fact, as will be seen hereafter, data memory address information, which only has significance when data is collected by the DCM, is an input to the FIFO of the present system. Obviously, that input is idle except where the data collection function is added to the system.

The other segment of the DCM is the utilization monitor 20D. The utilization monitor is primarily designed to determine the active time of any of up to 256 devices on the channel. An overall channel utilization unit also forms an integral part of the DCM. Thus, any device can be monitored for its percent of utilization, for example, over a 5 minute interval at a readable resolution of 4 milliseconds. The actual resolution of the utilization counters is 250 microseconds. The utilization data in the utilization monitor 20D is transfered back to the shared memory RAM 39A on the DMA shared memory bus under control of the DMA bus controller 34. This sequence is set up by the FEP 32 and is then handled by the DMA controller and the DCM selected for the particular transfer independent of any processor activity. At the completion of the transfer FEP 32 is interrupted and the transfer status is reported.

Figure 3:
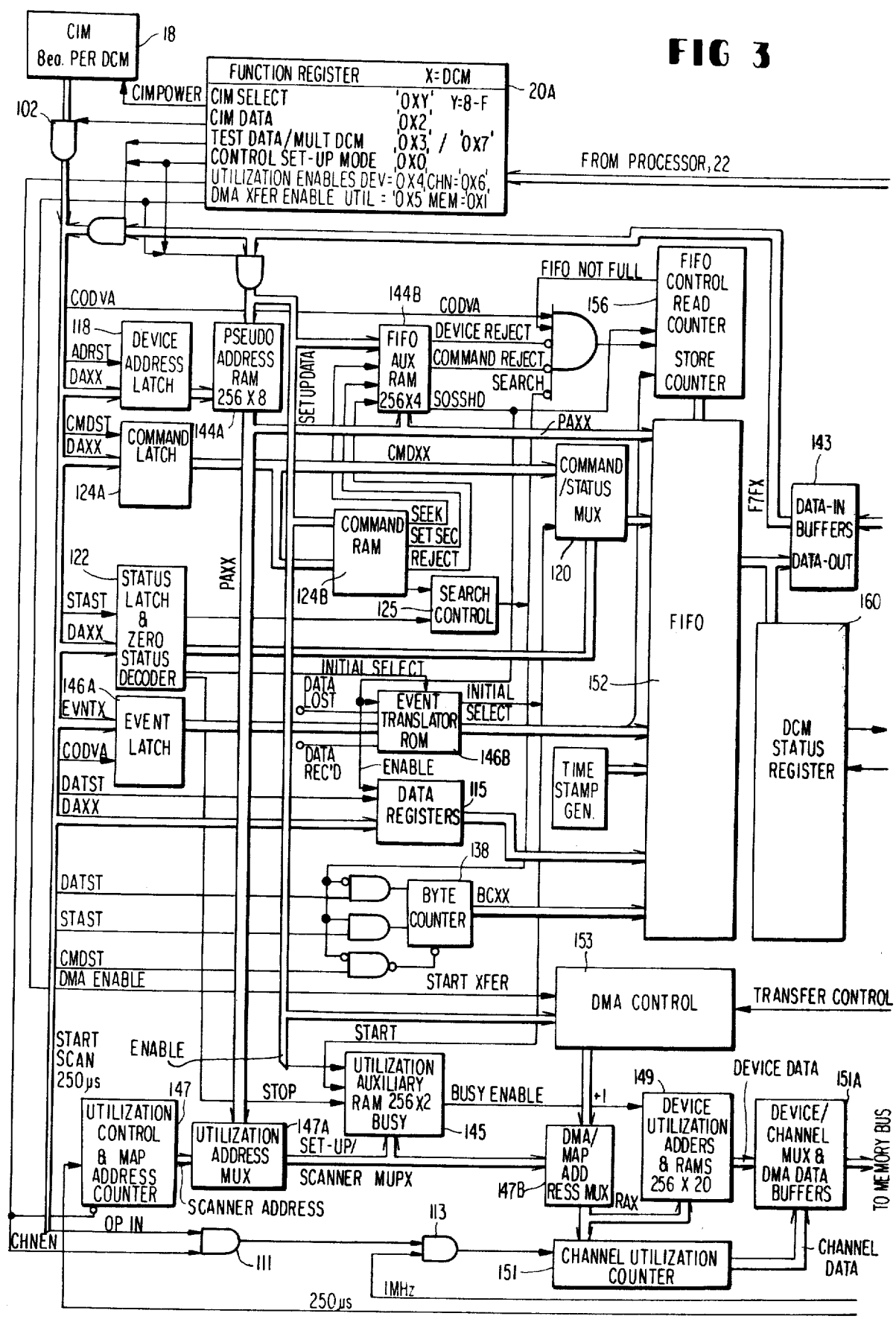
FIG. 3 is a block diagram of a data collection module according to a preferred embodiment of the present invention.

With reference now to FIG. 3, the function register 20A of the DCM will be described in more detail. The function register 20A functions as the initial set-up control unit for the DCM and is the initial point for communication with the FEP. Initially the function register 20A must be selected to place the DCM in a set-up mode such that the data transmitted from the shared memory 39A can be placed in the appropriate set-up registers in the DCM, that is, the pseudo addresses, the device rejects, and the like. The FEP directly sets the function register 20A through its CRU. Each DCM has 16 separate bits available to it for controls associated uniquely with that DCM. The first one of these as discussed above is the set-up mode bit 0. The next group of bits (not necessarily in their numerical order but in their order of importance) are the CIM data or test data select. These two control bits select the direction or unit from which the DCM will collect data, that is, whether it is to collect data from the actual host computer or from the test mode bus. Since the system is capable of having eight CIM's for every DCM, yet only one of those eight can be active at any one time, the function register 20A acts to select one CIM from the group of CIM's connected to it. Designated function register bits (8-F as shown in the diagram of FIG. 3) accomplish this CIM select function which in actuality selects the power to the particular CIM desired.

Another function register control activity is the selection of the utilization DEV and CHN enables. The fourth bit selects the device utilization enable DEV and the six bit select the channel utilization enable CHN. The seventh bit in the function register is strictly a test mode function and is used to define a second DCM placed in a test mode. This is a requirement only because the simulator is designed to function with only one DCM responding to the data which the simulator outputs onto the bus at any given time. All but one DCM must have this bit set to the active state when it is in the test mode running simulated data operation. There are also provided for block transferring data to the shared memory enable bits. The state of these bits indicates whether the system is to transfer utilization data or host data to the shared memory. Only one DCM at a time can be selected to transfer data on the DMA, i.e., to the shared memory.

Data, control signals and event codes from the CIM are applied to the DCM via receiver 102 shown in FIG. 3. The various strobe signals are applied to respective registers or latches as described hereafter. The ADDRESS STROBE is applied to a device address latch 118. At the same time that an ADDRESS STROBE is received, the information on the input bus line DAXX will consist of the address of a peripheral device connected to the computer channel. That address on DAXX will be gated into latch 118 by the ADDRESS STROBE and thereafter addresses a control RAM 144A which has a separate address location for each peripheral device address. The pseudo address, like the input address, identifies the particular device. However, the pseudo address corresponds to the address in the memory associated with the microcomputer, wherein all of the information about the device is collected.

When the device address interrogates RAM 144A it outputs the pseudo address. The pseudo address is applied to an input to the FIFO 152 and also serves to address several devices in the DCM. One such device is the auxilliary RAM 144B. That RAM is 256×4 bit random access memory and stores a 4 bit half byte for each pseudo address, i.e., for each peripheral device. One bit position is for a device reject bit and is entered during set up by the user. Thus, for every peripheral device which the user wants to ignore, a device reject bit will be entered at the pseudo address of that peripheral device in the RAM 144B. Of the four bits in each location, only the device reject bit is loaded during set up. The other three are entered and removed during measurement depending on activity on the channel. The other three bits designate respectively, command reject, seek, and set sector, and will be described in greater detail hereafter.

The COMMAND STOBE (CMDST) will occur whenever a command byte appears on the bus line, and a STATUS STROBE (STAST) will appear whenever a status byte appears on the bus line. The COMMAND and STATUS STROBES are applied to command and status latches 124A and 122, respectively, to gate the command and status bytes into those latches. The contents of latches 124A and 122 are applied as to the command/status multiplexer 120 which decides whether the command byte or the status byte should be collected by the FIFO 152. The command/status multiplexer 120 and latches 122 and 124A operate broadly as follows. Whenever a COMMAND STROBE is sensed, the command byte is loaded into latch 124A. Whenever a STATUS STROBE is sensed, the status byte is loaded into latch 122. If the status byte is of the form OOOOXXOO, where X can be either one or zero, this indicates that the sequence on the channel which has been commanded by the CPU can take place. This condition is detected in the status latch as an INITIAL SELECT which is applied to the event translator ROM 146B and therethrough to the multiplexer 120 and utilization RAM 145. The command/status multiplexer 120, in this case, will gate the command byte to the FIFO 152. On the other hand, if the status byte is of a form other than OOOOXXOO, this signifies that the commanded sequence cannot take place. In this case the status byte will be entered into the FIFO 152.

Figure 11:
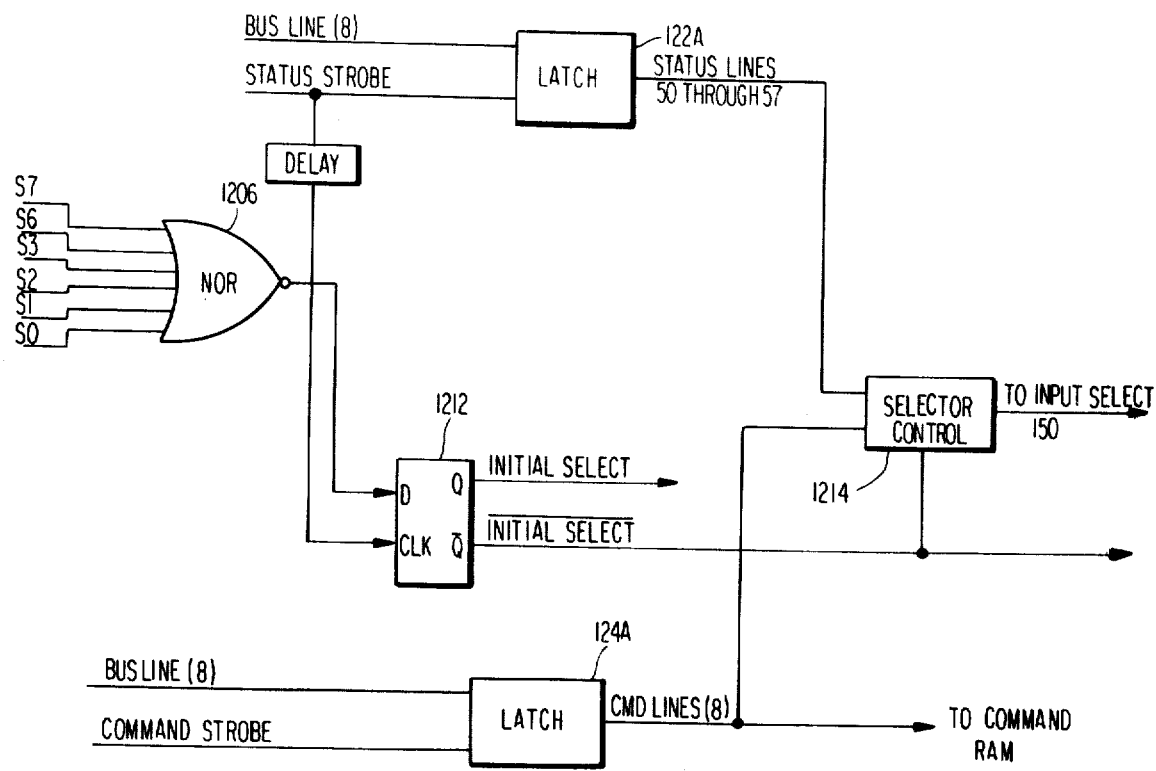
FIG. 11 is a block diagram of the command/status selector and the command register shown generally in FIG. 3.

A simple logic circuit for carrying out the logic of latches 122, 124A and multiplexer 120 is shown in FIG. 11. If the STATUS STROBE is TRUE and any one or more of the status byte bits S7, S6, S3, S2, S1 and S0 is TRUE, the NOR gate 1206 causes a true INITIAL SELECT output. The INITIAL SELECT control line is the Q output of a D-type flip-flop 1212, whose clock input receives the delayed STATUS STROBE and whose D input is TRUE when the status byte equals OOOOXXOO. Thus, when the status byte is equal to OOOOXXOO, the D input will be TRUE, and a simultaneously occurring STATUS STROBE will cause the INITIAL SELECT output to be TRUE. This indicates that the addressed device will carry out the initial select sequence at this time.

The DCM also includes a command RAM 124B which plays a role in several operations. It detects SEEK and SET SECTOR commands and thereby enables the DCM to capture the data bytes associated therewith. It detects SEARCH commands and thereby initiates a reject operation which allows the DCM to ignore redundant signals which usually follow a SEARCH command. And it provides a command reject function which permits the DCM to completely ignore preselected commands irrespective of the peripheral device to which the commands pertain.

Before describing the details of the above operations it will be noted that information bytes are entered into FIFO 152 under control of FIFO control counter 156, which is, in turn, actuated by an EVENT STROBE from the CIM. The latter is designated code valid (CODVA) in FIG. 3. The loading of the FIFO is blocked by blocking CODVA from entering FIFO control 156. This is accomplished by each of the signals DEVICE REJECT and COMMAND REJECT from the auxiliary RAM 144B and by SEARCH from the search control. The conditions under which DEVICE REJECT becomes TRUE have been described above.

In the CPU channel, the SEEK and SET SECTOR commands pertain to disk drives. They result in a unique but short sequence of information occurring on the bus lines of the channel. The unique information is address information, but it should be distinguished from address bytes occurring along with the address flag. The latter bytes address peripheral devices. The former represent addresses internal to the disc drives. This information is accompanied by a data flag and is treated as data by the monitor up to entry into the data registers 115.

When a SEEK or SET SECTOR command occurs, that command like all others will enter latch 124A. The command RAM 124B decodes these commands and provides SEEK and SET SECTOR bits to the auxiliary RAM 144B where they are entered into the location defined by the pseudo address (PAXX) of the peripheral device responding to the command. Each time that peripheral device puts disk address information on the bus lines of the channel in response to a SEEK or SET SECTOR command, that disc address information will be entered into Data Registers 115 via DAXX in response to the data strobe DATST and an ENABLE generated by the Auxiliary RAM. The latter is generated only where the pseudo address currently addressing the auxiliary RAM addresses a location which has the SEEK or SET SECTOR bits stored therein.

Data register 115, is used to supply disc drive address information to the FIFO 152. Data register 115 consists of two stages of two eight-bit registers, a decoder and several AND and OR gates. It will be noted that in the embodiment described, data per se is not collected in the FIFO. The data bytes on the data bus which are latched by the data registers 115 and sent to the FIFO represent addresses obtained during SEEK and SET SECTOR commands, i.e., addresses within disc drives. However, the monitor can easily be modified to also collect data per se if that is desired.

The command RAM 124B also recognizes SEARCH commands such as identifier and key. The SEARCH commands work in the host system in the following manner. The computer issues a search command during an initial select sequence followed by data identifying the search area and target. The peripheral device will reply with an End Procedure which will indicate that the search was completed and the target was or was not found. If found, the computer will move on to a new sequence. If not, the computer will repeat the search request and will continue to do so until the target is located. This sequence can occur many times before the target is found. The only information required for measurement purposes is an indication that a search was performed, how many tries were required, and how long it took. Without the search logic, the FIFO 152 would store an initial select and an End Procedure for each search sequence attempted. The search logic in the DCM allows the first initial select of a search sequence to be stored in the FIFO 152 but prevents any further stores until the target is found at which time it then stores the final End Procedure. The search logic also utilizes the Search/Data Byte Counter 138 to count End Procedures. This count is stored in the third FIFO word. With the initial select Command and Time Stamp and the End Procedure count and Time Stamp, all necessary measurement data is obtained.

When a SEARCH command enters the command latch 124A it is decoded by the command RAM 124B and results in an output to the search control 125. The latter circuit causes its SEARCH output to become TRUE. This blocks CODVA from the FIFO control 156 and enables byte counter 138 to begin counting the number of search requests. However before this happens, the initial SEARCH command passes through the command/status multiplexer 120 to the FIFO 152 in response to the initial CODVA. The remainder of the information pertaining to the repetitive search requests are blocked from the FIFO 152 except that the byte counter 138 accumulates the requests.

When the host system finally locates that which it is searching for it places a channel end, device end, or status modified byte on the bus lines and raises the status flag. This status condition is detected by latch 122 which thereafter disables search control 125. Thus, the byte counter 138 stops counting and the next CODVA is allowed to enter the FIFO control.

The command reject function operates to reject all information relative to preselected commands. During set up the user decides on those commands for which he needs no information. The command RAM 124B is capable of storing reject bits at 256 locations corresponding to 256 commands. Each command in latch 124A addresses the command RAM 124B and if reject bits are at the addressed location, indicating that the command is to be rejected, those bits are entered into the auxiliary RAM 144B at a location defined by the pseudo address. The auxiliary RAM 144B raises the output COMMAND REJECT which blocks CODVA from FIFO control 156. Thus, for as long as the selected peripheral device is carrying out operations pertaining to the monitor-rejected command, the monitor will not capture any information on the channel concerning that peripheral.

It will also be realized by one of ordinary skill in the art that access to the channel is had by several peripherals executing several different commands. Consequently the storage of bits representing DEVICE REJECT, COMMAND REJECT and SEEK AND SET SECTOR within locations defined by the pseudo address, and the read out of those bits in response to the same pseudo address, insures that only that information intended to be blocked from the FIFO will be so blocked.

The DCM also includes an event translator ROM 146B which performs the same function as the event translator of the Furtman et al patent. There are some differences. First, in the present embodiment the device is a ROM rather than hardwired logic. Anyone of ordinary skill in the art will realize how to implement logic of the Furtman et al event translator using a ROM. The basic function is to receive the three bit CIM event codes from event latch 146A and the control signals INITIAL SELECT, DATA RECEIVED, SEEK, SET SECTOR and LOST DATA and to provide a 4 bit DCM or output event code. The input and output event codes are the same as in Furtman et al except that unlike the latter, the present embodiment provides different DCM event codes for asynchronous status following seek and asynchronous status following set sector. Presently the DCM event code for asynchronous status following seek is 0001, and the DCM event code for asynchronous status following set sector is now 0101. The INITIAL SELECT and DATA RECEIVED inputs are generated in the same manner as in the Furtman patent. The block for generating DATA RECEIVED is not illustrated herein so as not to needlessly encumber the drawings. The SEEK and SET SECTOR inputs come from the RAM 144B. The output from RAM 144B designated SOSSHD is in actuality the result of ORing two outputs, Seek Hold and Set Sector Hold. In practice, the latter two outputs are applied to the event translator ROM 146B. The LOST DATA input will be generated exactly as in the Furtman et al patent whenever the data collecting features, mentioned previously, are added. Otherwise, it will be generated by simple logic which receives the SOSSHD signal and counts the Data Strobes occurring during the latter signal. If more than six are counted the line LOST DATA will be TRUE. It will be apparent that in this case the LOST DATA input is indicating that more SEEK or SET SECTOR addresses have been received than can be loaded into Data Registers 115.

Figure 7:
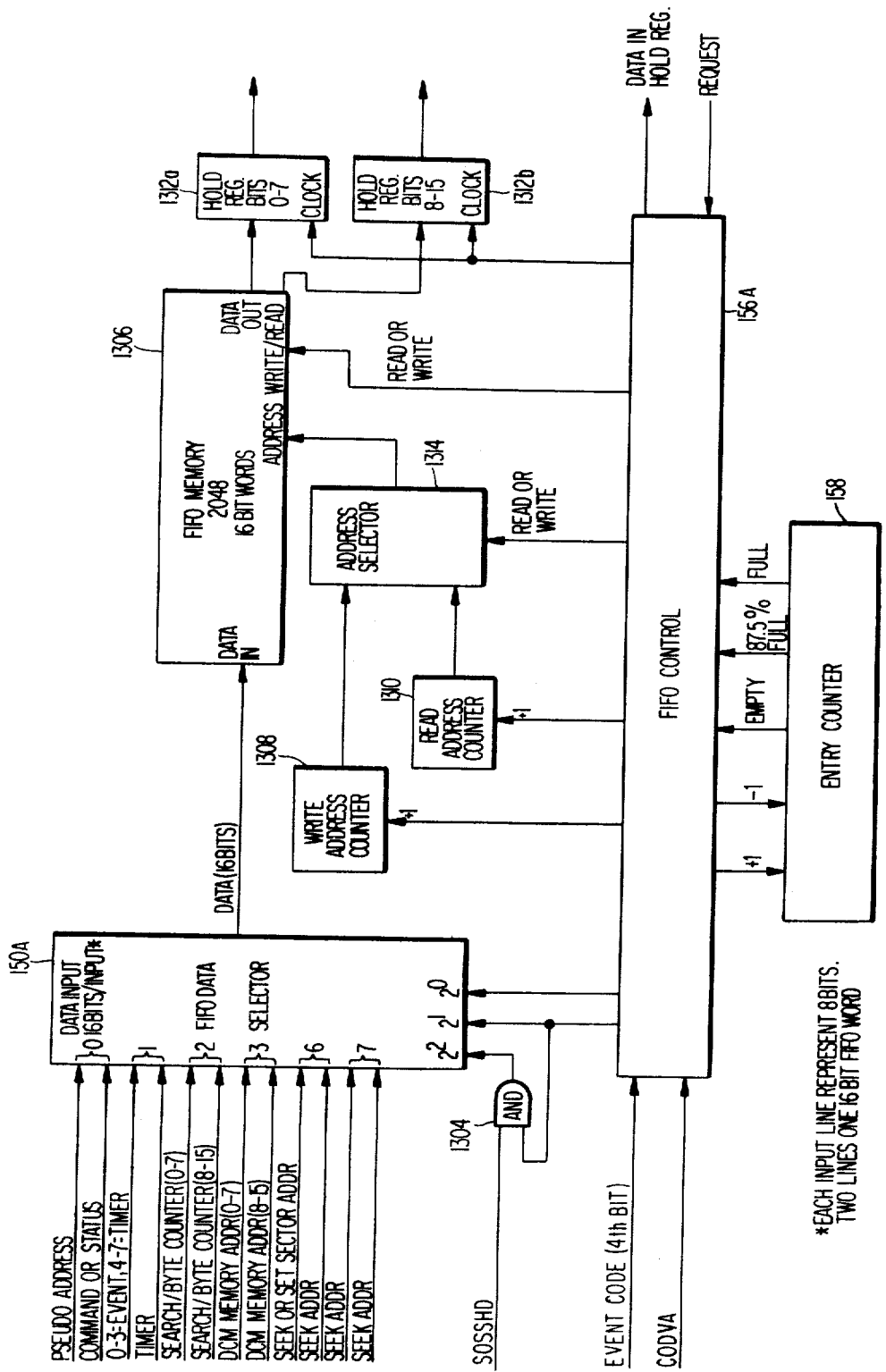
FIG. 7 is a block diagram of the FIFO and FIFO control apparatus of FIG. 3.

Referring to FIG. 3 which shows the main operating portions of the DCM, the data entered into the FIFO 152 for each packet is arranged in groups of words. Each packet includes either two or four words, with each word including two eight-bit bytes. A block diagram of the FIFO 152 and FIFO control 156 is illustrated in FIG. 7. The eight bytes constituting the four words 0–3 of a packet are selected by FIFO data selector 150A, two bytes at a time, in response to the selector address.

Each of the lines applied to the FIFO data selector 150A represents an eight-bit byte, the bits being in parallel. The particular word selected to appear at the output depends on the three-bit select address which is applied by the FIFO control 156A.

The relationship between the words 0–3, the input byte lines to selector 150A, the fourth bit of the DCM event code applied to the FIFO control 156A and the selector address will now be explained.

Words numbered 0 and 1 will be part of every packet irrespective of the output event code. The pseudo address makes up the first eight bits of word 0. The command or status word, which consists of eight bits, makes up the second eight bits of word 0. The four-bit output event code plus the most significant four bits of the twelve-bit time stamp make up the first byte of word 1. The last eight bits of the time stamp make up the second byte of word 1.

The above four bytes always constitute the words 0 and 1 of the packet. When the output event code strobe CODVA goes TRUE, a counter in FIFO control 156A begins counting, starting with a count 00 and applies the same to the address input of selector 150A. The count advances from 00 to 01, thereby causing selector 150A to sequentially apply the words on lines 0 and 1 to the selector output.

Subsequent activity depends upon the output event code and the status of the SEEK or SET SECTOR input. If the most significant bit of the output event code is 0, words 0 and 1 will be the only words included in the packet of information. Thus, no further byte lines will be selected by selector 150A. If the most significant bit is a 1, four words are to be included in the packet. Under the latter condition, which is easily detected in FIFO control 156A by noting the status of the most significant bit of the output event code, the counter will advance two more counts, starting with 10 and ending with 11. The selector address, however, also depends on the status of SEEK or SET SECTOR. If the latter is FALSE, the addresses applied to the selector 150 are successively: 010 and 011. Thus, words on lines 2 and 3 will be sequentially connected to the selector output to constitute words 2 and 3 of the packet. If SEEK or SET SECTOR is TRUE, due to AND gate 1304, the successive addresses will be: 110 and 111. The words on lines 6 and 7 will be successively selected.

The sixteen bits of the search/data byte counter 138 (FIG. 3) are applied to the selector on word line 2. The sixteen-bit DCM memory address from a write address register is applied to the selector on word line 3. However, as pointed out previously this input is idle except where apparatus is added to perform data collection. The seek or set sector address, constituting four bytes obtained from data buffer registers 115 (FIG. 3), is applied via byte lines 6 and 7.

The bytes from selector 150A are written into FIFO memory 1306, under control of a write input from FIFO control 156A, at an address corresponding to that in write address counter 1308. As the counter in FIFO control is advanced to place words on the selector 150A output line, the write address counter 1308 is advanced by a count of one and the write input is applied to the memory 1306; also, a +1 is applied to entry counter 158.

Whenever the holding registers 1312a and 1312b are empty and the FIFO contains data, FIFO control causes bytes to be read out of FIFO memory 1306 and placed into the holding registers. The address selector 1314 selects a read or write address depending on the operation to be performed.

Whenever a packet is to be sent to the microcomputer for formatting and presenting to the user, a request comes in to the FIFO control. This causes the latter to present the holding register data to the microcomputer and after the data is taken from the holding register to apply a read input to memory 1306 to read out the word stored in the address held in read address counter 1310. Another word is read from memory 1306 and held in holding registers 1312a and 1312b, respectively. The counter 1310 is advanced by a count of one for each word read from memory 1306. Also, each word read results in a −1 being applied to entry counter 158. The latter keeps track of the number of words stored in memory 1306 and causes the output lines empty, 87.5% full and full to go true when those respective conditions exist in memory 1306.

The DCM also provides percent activity information, also known as utilization information, for the channel as a whole and for each peripheral device on the channel. Channel utilization is the amount of time the channel is actually connected to devices and is defined as the time the OPIN tag line is true. Device utilization is the time that a given device is busy and is defined as the time from a valid initial select to a device end status for a given device.

Both channel and device utilization are obtained by accumulating counts when the respective device or channel is busy. The counts are accumulated in respective 20-bit memory locations that may be referred to as counters. A single counter, designated channel utilization counter 151, accumulates counts at the rate of 1 MHZ during the time the channel is busy and provided the user has set up the system to obtain channel utilization information. Specifically, during set up the user provides the necessary input to the function register 20A so as to cause it to output a channel utilization enable signal (CHNEN). The latter is ANDed with OPIN from the CIM in AND gate 111 and further ANDed with the 1 MHZ clock in gate 113. The 20 bit counter 151 will thus contain the utilization information for the channel. The channel utilization information is sent to the microcomputer, specifically to the shared memory of the microprocessors, via multiplexer 151A, under control of DMA control 153.

Device utilization is obtained in RAM 149 which includes 256 20-bit storage locations, or counters, corresponding to 256 possible peripheral devices. An auxiliary RAM 145 also contains 256 storage locations, one per peripheral device. During set up the operator selects those peripheral devices for which utilization information is to be obtained and actuates the function register 20A to place an ENABLE bit in RAM 145 at each address corresponding to the selected peripheral devices.

Each of the 256 locations in RAM 145 has two bit positions. One is for the ENABLE bit, already described. The other is for the BUSY bit. When a peripheral device begins an operation it puts its address and status indication on the channel. When it has completed an operation it puts its address and a DEVICE END status indication on the channel. Circuitry in the DCM detects these signals and places a BUSY bit in the corresponding location of RAM 145 when the device starts and removes it, i.e. enters a zero bit, when the device stops. A SELECTIVE RESET command to the busy device will also reset the BUSY bit in the DCM.

Specifically, the INITIAL SELECT output from event translator ROM 146B is the START control signal applied to RAM 145. The pseudo address of the device is applied from RAM 144A via multiplexer 147A to the address input of RAM 145. Thus a BUSY bit is loaded in the RAM 145 location corresponding to the device whose psuedo address is also applied to RAM 145. The BUSY bit is removed in the same manner as it is loaded into the RAM. The only difference is that removal, or placement of a zero bit in the appropriate location, is controlled by a STOP signal on the START/STOP line, the latter occurring when the status latch detects DEVICE END or SELECTIVE RESET status.

As a result of the above described loading of the RAM 145, at any given time the RAM contains, for every peripheral device, an indication of whether or not the utilization of that device is desired and an indication of whether or not that device is presently busy. The accumulation of counts for each device takes place in the 256 20-bits counters of RAM 149.

The system operates on a scanning principle. Every 250 usec a new scan begins, and during each scan the system looks at the busy status of each of the 256 devices. If a device is busy and it has been selected as one for which utilization information is desired, a 1-bit is added to its counter. Otherwise no bits, or a zero bit, is added during that scan. Specifically, every 250 usec the utilization control and map address counter 147 is actuated to begin the scan. This counter begins counting and cycles through the 256 counts corresponding to 256 pseudo addresses. Each address is applied via multiplexer 147A to RAM 145 and via multiplexer 147B to RAM 149. If the addressed location in RAM 145 contains ENABLE and BUSY bits a +1 is placed on the BUSY:ENABLE output line and is accumulated by the counter in RAM 149 that is selected by the same pseudo address.

The DMA control 153 operates to control read out of the device utilization counters and the channel utilization counters. Data from the front end processor of the microcomputer controls which of the counters are to be read out. This data is entered into DMA control via data-in buffers 143. This data selects the first device for which utilization information is to be transferred to the shared memory of the microcomputer. When the DMA control 153 receives a TRANSFER CONTROL signal from the microcomputer, the control device, via multiplexer reads out the selected counters in RAM 149 and the counter 151. It should be noted that in the preferred embodiment only the most significant 16 bits of a counter are read out and reset. The entire counters are reset upon set up of the system.

The DCM notifies the FEP of error conditions via the DCM status register 160. The data from this register is read out onto the FIFO data bus when an ACKNOWLEDGE signal is received. An identifier code representing the number of the corresponding DCM is given with each status update.

This completes the description of the preferred embodiments of the invention. Although preferred embodiments have been described, it is believed that numerous modification and alterations thereto would be apparent to one having ordinary skill in the art without departing from the spirit and scope of the invention.

What is claimed is:

1. A system for monitoring the performance of peripheral devices connected to and accessed by a central processing unit via a CPU channel of the type which carries data, addresses, commands, status information and a plurality of condition flags, comprising:

a channel interface module connected as a peripheral device to said channel, said channel interface module comprising data selector means for receiving all said data, address, command and status information on said channel and providing same on a bus line output thereof, a signal level circuit connected to receive at an input thereof certain ones of said condition flags from said channel and for providing condition strobes at an output thereof in response to said certain ones of said condition flags, and event means connected to receive certain ones of said condition flags from said channel and for providing input event codes representing selected sequences and combinations of said condition flags and an event code strobe in response to said condition flags received thereby;

a data collection module connected to said channel interface module and comprising a packet memory, said data collection module being responsive to the information on said bus line output, said condition strobes and said input event codes for selectively collecting and generating and storing in said packet memory information about peripheral devices when said peripheral devices are accessed on said channel, and said data collection module comprising device utilization means responsive to address and status information from said channel interface module for generating, for each of selected peripheral devices connected to the channel, information representing the time period said peripheral device is operating, said device utilization means comprising, a first device utilization storage means having a plurality of storage locations therein, assigned to and corresponding to a plurality of peripheral devices, respectively, means for storing enable indicators in those of said storage locations of said first device utilization storage means corresponding to those of said peripheral devices, selected for utilization monitoring, status and address responsive means responsive to status information and address information for storing busy indicators in the said storage locations of said first device utilization storage means corresponding to said peripheral devices only during the period said devices, respectively, are operating, scanning means for periodically scanning all said storage locations of said first device utilization storage means corresponding to said peripheral devices;

and second device utilization storage means, having plural accumulating locations assigned to and corresponding to said plurality of peripheral devices, for incrementing once per scanning period each said accumulating location for which said corresponding location in said first device utilization storage means contains an enable indication and a busy indication.

2. A system as claimed in claim 1 wherein said first and second device utilization storage means comprise first and second random access memories.

3. A system as claimed in claim 2 wherein said scanning means comprises sequential address generating means responsive to periodic pulses for sequentially generating once each period addresses corresponding to said plurality of peripheral devices and applying said addresses to said first random access memory to determine the location therein being examined for busy and enable indicators and to said second random access memory to determine the accumulating location to be incremented.

4. A system as claimed in any one of claims 1, 2, or 3 wherein said data collection module further comprises monitoring means responsive to a condition strobe from said channel interface module, which indicates that the channel is being used, for measuring the time period utilization of usage of said channel.

5. A system as claimed in claim 4 wherein said last mentioned monitoring means comprises counter means responsive to clock pulses during the presence of an OPIN flag on the channel for counting said clock pulses.

6. A system for monitoring the performance of peripheral devices connected to and accessed by a central processing unit via a CPU channel of the type which carries data, addresses, commands, status information and a plurality of condition flags, and wherein said central processing unit is of the type which is capable of supplying a consecutive sequence of search commands to a peripheral unit via said channel and at least one of said peripheral units is of the type which responds to each search command direction to it and provides a response indication to the CPU via the channel, comprising:

a channel interface module connected as a peripheral device to said channel, said channel interface module comprising data selector means for receiving all said data, address, command and status information on said channel and providing same on a bus line output thereof, a signal level circuit connected to receive at an input thereof certain ones of said condition flags from said channel and for providing condition strobes at an output thereof in response to said certain ones of said condition flags, and event means connected to receive certain ones of said condition flags from said channel and for providing input event codes representing selected sequences and combinations of said condition flags and an event code strobe in response to said condition flag received thereby;

a data collection module connected to said channel interface module and comprising a packet memory, said data collection module being responsive to the information on said bus line output, said condition strobes and said input event codes for selectively collecting and generating and storing in said packet memory information about peripheral devices when said peripheral devices are accessed on said channel, and wherein said data collection module comprises command rejection means responsive to preselected commands received from said channel via said channel interface module for preventing information pertaining to said command and its execution from entering said packet memory irrespective of the peripheral device to which said command is directed.

7. A system as claimed in claim 6 wherein said data collection module further comprises, control means for initiating entry of information in said packet memory when enabled by an event code strobe signal from said channel interface module, and wherein said command rejection means comprises means responsive to said received preselected commands for generating a command reject signal and means responsive to said command reject signal for blocking said event code strobe signal from enabling said control means.

8. A system as claimed in claim 7 wherein said means for generating a command reject signal is a command random access memory (RAM) whereby commands to be rejected can be selected by adding command reject bits to locations in said command RAM corresponding to said preselected commands.

9. The system as claimed in claim 8 wherein said data collection module further comprises means responsive to a search command received from said channel interface module for counting the number of consecutive search commands and for selectively entering into said packet memory only the first in any consecutive sequence of search commands, a termination indicia at the end of the response of a peripheral unit to the last of said consecutive search commands, and the number of consecutive search commands.

10. The system as claimed in claim 9 wherein said last mentioned means comprises said command RAM, said command RAM providing a search signal in response to a search command from said channel interface module, and search control means responsive to said search signal for blocking said code valid signal from enabling said control means.

11. A system for monitoring the performance of peripheral devices connected to and accessed by a central processing unit via a CPU channel of the type which carries data, addresses, commands, status information and a plurality of condition flags, and wherein said central processing unit is of the type which is capable of supplying a consecutive sequence of search commands to a peripheral unit via said channel and at least one of said units is of the type which responds to each search command directed to it and provides a response indication to the CPU via the channel, comprising:
- a channel interface module connected as a peripheral device to said channel, said channel interface module comprising data selector means for receiving all said data, address, command and status information on said channel and providing same on a bus line output thereof, a signal level circuit connected to receive at an input thereof certain ones of said condition flags from said channel and for providing condition strobes at an output thereof in response to said certain ones of said condition flags, and event means connected to receive certain ones of said condition flags from said channel and for providing input event codes representing selected sequences and combinations of said condition flags and an event code strobe in response to said condition flags received thereby;
- a data collection module connected to said channel interface module and comprising a packet memory, said data collection module being responsive to the information on said bus line output, said condition strobes and said input event codes for selectively collecting and generating and storing in said packet memory information about peripheral devices when said peripheral devices are accessed on said channel, and
- wherein said data collection module further comprises means responsive to a search command received from said channel interface module for counting the number of consecutive search commands and for selectively entering into said packet memory only the first in any consecutive sequence of search commands, a termination indicia at the end of the response of a peripheral unit to the last of said consecutive search commands, and the number of consecutive search commands.

12. A system for monitoring the performance of peripheral devices connected to and accessed by a central processing unit via a CPU channel of the type which carries data, addresses, commands, status information and a plurality of condition flags, comprising:
- a channel interface module connected as a peripheral device to said channel, said channel interface module comprising data selector means for receiving all said data, address, command and status information on said channel and providing same on a bus line output thereof, a signal level circuit connected to receive at an input thereof certain ones of said condition flags from said channel and for providing condition strobes at an output thereof in response to said certain ones of said condition flags, and event means connected to receive certain ones of said condition flags from said channel and for providing input event codes representing selected sequences and combinations of said condition flags and an event code strobe in response to said condition flags received thereby;
- a data collection module connected to said channel interface module and comprising a packet memory, said data collection module being responsive to the information on said bus line output, said condition strobes and said input event codes for selectively collecting and generating and storing in said packet memory information about peripheral devices when said peripheral devices are accessed on said channel, and
- said data collection module further comprising, auxilliary memory means for storing in address locations therein, assigned to and corresponding to said peripheral devices, respectively, seek and set sector flag bits to indicate the execution of seek and set sector commands, respectively, by said peripheral devices, means responsive to a seek or set sector command occurring on said channel for entering said seek or set sector flag bits respectively into the location of said auxilliary memory means corresponding to the peripheral device commanded to perform said seek or set sector command, said auxilliary memory means being responsive to peripheral device address information on said channel for outputting a seek or set sector hold signal if said memory contains seek or set sector flag bits for said addressed peripheral device, and data register means responsive to said seek or set sector hold signal for receiving and holding and subsequently transferring to said packet memory the addresses placed on said channel by the peripheral devices executing seek or set sector commands.

13. The system as claimed in claim 12 wherein said means for entering said flag bits comprises,
- a command random access memory (RAM) responsive to seek or set sector commands from said channel interface module for applying seek or set sector flag bits to said auxilliary memory, and address memory means responsive to address information from said channel interface module for controlling the entry of said applied flag bits into said auxilliary memory.

14. A system as claimed in claim 13 wherein said data collection module comprises command rejection means responsive to preselected commands received from said channel via said channel interface module for preventing information pertaining to said command and its execution from entering said packet memory irrespective of the peripheral device to which said command is directed.

15. A system as claimed in claim 14 wherein said data collection module further comprises, control means for initiating entry of information in said packet memory when enabled by a code valid signal from said channel interface module, and wherein said command rejection means comprises means responsive to said received preselected commands for generating a command reject signal and means responsive to said command reject signal for blocking said code valid signal from enabling said control means.

16. A system as claimed in claim 15 wherein said means for generating a command reject signal comprises said command RAM and said auxilliary memory means, said command RAM having storage locations therein corresponding to said respective command whereby command reject flag bits are stored in those locations corresponding to commands to be rejected, whereby each command operating on said channel accesses said command RAM causing it to output a command reject flag bit where one exists in the corresponding location and to place it in the corresponding device location in said auxilliary memory, whereby the occurrence of a device address on said channel accesses said auxilliary memory to output a command reject signal if a command reject flag bit is in the corresponding storage location of said auxilliary memory.

17. The system as claimed in any of claims 6, 7, 8, 9, 10, 11, 12, 13 or 16, wherein said data collection module comprising device utilization means responsive to address and status information from said channel interface module for generating, for each of selected peripheral devices connected to the channel, information representing the time period said peripheral device is operating.

18. A system as claimed in claim 17 wherein said device utilization means comprises, a first device utilization storage means having a plurality of storage locations therein, assigned to and corresponding to a plurality of peripheral devices, respectively, means for storing enable indicators in those of said storage locations of said first device utilization storage means corresponding to those of said peripheral devices, selected for utilization monitoring, status and address responsive means responsive to status information and address information for storing busy indicators in the said storage locations of said first device utilization storage means corresponding to said peripheral devices only during the period said devices, respectively, are operating, scanning means for periodically scanning all said storage locations of said first device utilization storage means corresponding to said peripheral devices, and second device utilization storage means, having plural accumulating locations assigned to and corresponding to said plurality of peripheral devices, for incrementing once per scanning period each said accumulating location for which said corresponding location in said first device utilization storage means contains an enable indication and a busy indication.

19. A system as claimed in claim 18 wherein said first and second device utilization storage means comprise first and second random access memories.

20. A system as claimed in claim 19 wherein said scanning means comprises sequential address generating means responsive to periodic pulses for sequentially generating once each period addresses corresponding to said plurality of peripheral devices and applying said addresses to said first random access memory to determine the location therein being examined for busy and enable indicators and to said second random access memory to determine the accumulating location to be incremented.

21. A system as claimed in claim 20 wherein said data collection module further comprises monitoring means responsive to a condition strobe from said channel interface module, which indicates that the channel is being used, for measuring the time period utilization of usage of said channel.

22. A system as claimed in claim 21 wherein said last mentioned monitoring means comprises counter means responsive to clock pulses during the presence of an OPIN flag on the channel for counting said clock pulses.

* * * * *

UNITED STATES PATENT AND TRADEMARK OFFICE
CERTIFICATE OF CORRECTION

PATENT NO. : 4,367,525
DATED : Jan. 4, 1983
INVENTOR(S) : Brown et al

It is certified that error appears in the above-identified patent and that said Letters Patent is hereby corrected as shown below:

Column 5, line 64, change "Flag" to --flag--.

Column 6, line 33, change "formatting" to --formating--.

Column 7, line 4, change "contetion" to --contention--.

Column 16, line 65, change "formatting" to --formating--.

Column 20, line 21, change "direction" to --directed--.

Column 23, line 23, change "operating" to --occurring--.

Signed and Sealed this

Twenty-second Day of November 1983

[SEAL]

Attest:

GERALD J. MOSSINGHOFF

Attesting Officer   Commissioner of Patents and Trademarks